Feb. 9, 1926.

F. T. HOMAR

SHOCK ABSORBER

Filed Nov. 28, 1923

INVENTOR

Frank T. Homar

Patented Feb. 9, 1926.

1,572,484

UNITED STATES PATENT OFFICE.

FRANK T. HOMAR, OF TUCSON, ARIZONA.

SHOCK ABSORBER.

Application filed November 28, 1923. Serial No. 677,505.

*To all whom it may concern:*

Be it known that I, FRANK T. HOMAR, a citizen of the United States, and resident of Tucson, in the county of Pima and State of Arizona, have invented certain new and useful Improvements in Shock Absorbers, of which the following is a specification.

This invention relates to shock absorbers especially adapted for use upon automobiles. Briefly stated, an important object of this invention is to provide a shock absorber having novel means whereby a piston associated with the spring mechanism is caused to operate against a fluid so as to reduce shock to a minimum when the vehicle encounters an inequality in the roadway.

A further object is to provide a shock absorber of the character specified which is of highly simplified construction, durable in use and cheap to manufacture.

Other objects and advantages will be apparent during the course of the following description.

In the accompanying drawings, forming a part of this application, and in which like numerals are employed to designate like parts throughout the same, Figure 1 is a side elevation of the improved shock absorber applied.

Figure 1:
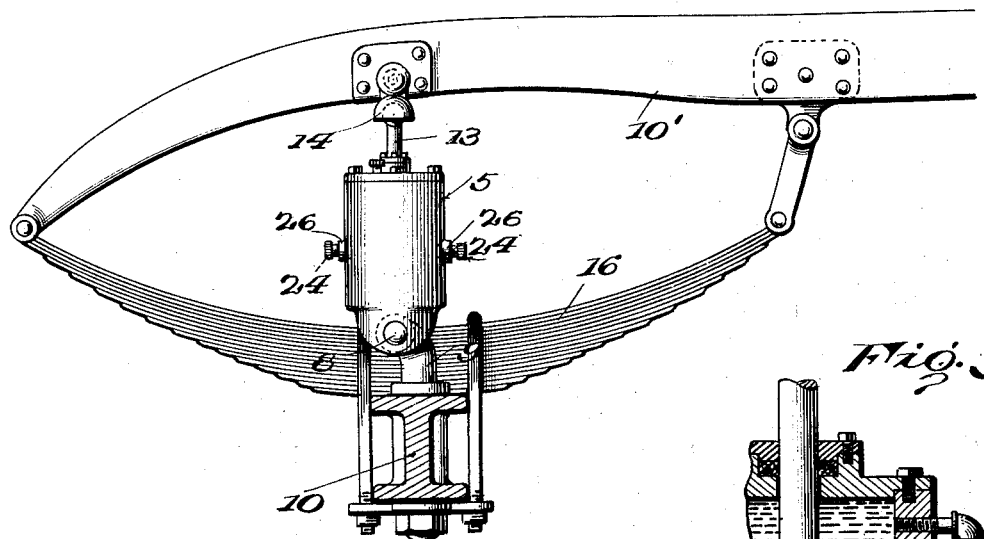

In the drawings wherein for the purpose of illustration there is shown a preferred embodiment of the invention, the numeral 5 designates a cylindrical casing, the lower portion of which is provided with one or more ears 6 having an aperture 7 for the reception of a pivot element 8. Figure 1 illustrates that the pivot element 8 is connected to a perch 9 carried by an axle or axle housing 10 of a motor vehicle.

Figure 2:
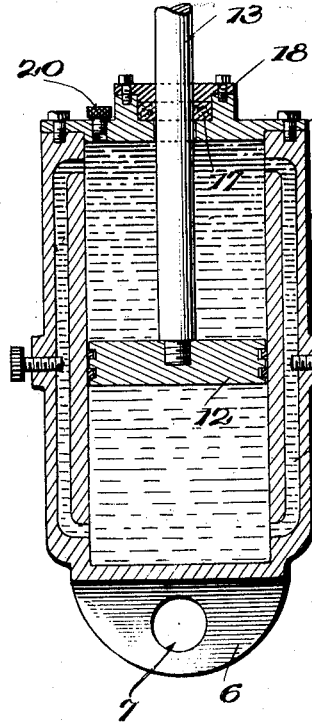
Figure 2 is a vertical sectional view through the same.

Figure 2 illustrates that a piston 12 is mounted for reciprocation in the cylinder 5 and has connections with the piston rod 13, the upper portion of which is connected by a ball socket joint 14 with the vehicle frame. Of course the spring may be of any desired style or shape.

A quantity of fluid is in the chamber of the cylinder 5, and the piston 12 upon being actuated works against the fluid and causes the fluid to pass through by-passes 16. The by-passes communicate at opposite ends of the chamber and on opposite sides of the piston 12.

Assuming that the vehicle strikes a bump in the roadway, the portion 10 will be elevated so that the fluid beneath the piston 12 will be forced up through the by-passes 16 and into the cylinder at a point above the piston 12. In this manner the shock and especially the rebound are reduced to a minimum. On the return movement, the pressure of the fluid prevents the wheels or the parts carrying the wheels from passing its original position to a substantial extent.

With reference to the foregoing description it will be seen that the improved shock absorber may be economically manufactured and placed upon a motor vehicle either during manufacture or at any time thereafter, without the exercise of unusual skill.

Of course the piston rod 13 has a liquid tight connection with the head 16 by means of a packing nut 17 held in place by means of a gland 18.

Figure 2 illustrates that a suitable filling plug 20 is threaded through the head 16 and affords a means whereby a liquid may be introduced into the cylinder. Of course, any suitable liquid such as water or oil may be employed.

Particular attention is directed to the fact that the flow of liquid through the by-passes 16 may be controlled by a hand screw 24 threaded through bosses 26 in the side of the casing 5, and the forward motion of the screws 24 regulates the quantity of liquid which may flow through the by-passes in a given period.

Figure 3:
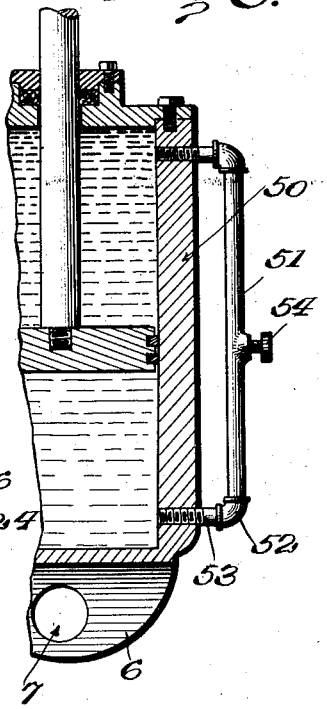
Figure 3 is a detail sectional view through a slightly modified form of the invention.

In the form of the invention illustrated in Figure 3, a by-pass tube 51 may be connected to opposite ends of the cylinder 50 by means of elbows 52 and short nipples 53. In this case a control screw 54 may be threaded into the intermediate portion of the tube 51 to control the flow of liquid through the same. It will be seen that the by-pass tube 51 and the associated elements provides an extremely simple and economical means for establishing communication between opposite ends of the cylinder and, of course, any desired number of by-pass tubes may be employed.

It is to be understood that the form of the invention herewith shown and described is to be taken as a preferred example of the same, and that such minor changes, arrangement, and construction of parts may be made as will remain within the spirit of the invention and the scope of what is claimed.

Having thus described the invention, what is claimed is:—

A shock absorber for motor vehicles comprising a cylindrical casing adapted for the reception of a quantity of liquid, a piston mounted for movement in said casing, a piston rod extending from said piston and having a substantially liquid tight connection with the casing, means whereby the free end of said piston rod may be universally connected with a vehicle frame, a head connected to said casing having an opening receiving said piston rod, means whereby the lower end of the casing may be hingedly connected to the axle of the vehicle, said casing provided at opposite sides with longitudinally extending by-passes having lateral branches communicating with the upper and lower end portions of the casing, and a hand operated screw bolt threaded into each of said by-passes midway the upper and lower ends thereof and controlling the flow of liquid therethrough.

FRANK T. HOMAR.